(12) United States Patent
Hunt (10) Patent No.: US 7,070,227 B2
(45) Date of Patent: Jul. 4, 2006

(54) MODULAR BASE FOR PICKUP TRUCK AND METHOD OF ASSEMBLY

(75) Inventor: Robert M. Hunt, Bingham Farms, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/661,018

(22) Filed: Sep. 12, 2003

(65) Prior Publication Data

US 2005/0057073 A1   Mar. 17, 2005

(51) Int. Cl.
*B62D 33/00* (2006.01)

(52) U.S. Cl. .................................................. 296/183.1

(58) Field of Classification Search ............. 296/183.1, 296/37.6, 24.3, 24.33, 24.45, 182.1, 186.5, 296/193.03, 193.04, 193.05, 35.1, 35.3
See application file for complete search history.

(56) References Cited

U.S. PATENT DOCUMENTS

| | | | | |
|---|---|---|---|---|
| 979,309 A | | 12/1910 | Johnston | |
| 2,230,635 A | * | 2/1941 | Alderfer | 296/3 |
| 2,596,478 A | * | 5/1952 | Gerhardt | 296/3 |
| 2,616,754 A | * | 11/1952 | Stahl | 296/183.1 |
| 4,126,349 A | * | 11/1978 | Nelson et al. | 296/37.6 |
| 4,249,295 A | * | 2/1981 | Lance | 29/416 |
| 4,582,308 A | | 4/1986 | Yagami et al. | 296/183 |
| 4,830,421 A | * | 5/1989 | Hawelka et al. | 296/24.45 |
| 5,000,502 A | * | 3/1991 | Lyall | 296/186.4 |
| 5,819,390 A | * | 10/1998 | Clare | 29/430 |
| 6,003,923 A | * | 12/1999 | Scott et al. | 296/37.6 |
| 6,033,002 A | * | 3/2000 | Clare et al. | 296/3 |
| 6,089,639 A | * | 7/2000 | Wojnowski | 296/37.6 |
| 6,099,070 A | * | 8/2000 | Yocum | 296/182.1 |
| 6,158,798 A | | 12/2000 | Stedtfeld et al. | 296/61 |
| 6,926,347 B1 | * | 8/2005 | Fior et al. | 296/182.1 |
| 2002/0101089 A1 | * | 8/2002 | Brown | 296/37.6 |
| 2002/0109376 A1 | * | 8/2002 | Gruich | 296/183 |
| 2003/0218360 A1 | * | 11/2003 | Henderson et al. | 296/183 |
| 2004/0056499 A1 | * | 3/2004 | McNally | 296/37.6 |
| 2004/0094985 A1 | * | 5/2004 | Mobley | 296/37.6 |
| 2005/0093339 A1 | * | 5/2005 | Klassen | 296/183.1 |
| 2005/0146151 A1 | * | 7/2005 | Walker | 296/37.6 |
| 2005/0225111 A1 | * | 10/2005 | Boyer | 296/37.6 |
| 2005/0225117 A1 | * | 10/2005 | Miskech et al. | 296/183.1 |

* cited by examiner

*Primary Examiner*—H. Gutman
(74) *Attorney, Agent, or Firm*—Laura C. Hargitt (57) ABSTRACT

A pickup truck includes a sidewall having a forward portion and a rearward portion with an elongated opening formed between the forward and rearward portion, and at least one fastening element mounted with respect to the sidewall at which any one of a plurality of differently-configured sidewall modules is mountable. The pickup truck forms a modular base to which any one of a plurality of sidewall modules is attachable to provide or modify the functionality or aesthetics of the pickup truck. Methods are also provided to advantageously employ the pickup truck and sidewall modules to provide flexibility in the assembly and use of pickup trucks.

8 Claims, 8 Drawing Sheets

MODULAR BASE FOR PICKUP TRUCK AND METHOD OF ASSEMBLY

TECHNICAL FIELD

This invention relates to pickup trucks that include a cargo box sidewall having an elongated opening between a cab and a rearward sidewall portion in which sidewall modules are positionable to add or alter sidewall functionality.

BACKGROUND OF THE INVENTION

A cargo-carrying box, also known as a "pickup box" or "pickup bed," for a light truck is typically constructed with a front wall, two sidewalls and a tailgate, all of which are of substantially equal height and whose top edges are high off the ground. Many pickup trucks are used for work purposes, and pickup trucks are often modified in some way to accommodate the needs of certain types of work. For example, tool boxes are often mounted across the front of the box, and racks are added to carry supplies such as pipes and ladders.

SUMMARY OF THE INVENTION

A pickup truck is provided. The pickup truck includes a cab and a sidewall forming part of a cargo box. The sidewall has a forward portion and a rearward portion. An elongated opening is formed in the sidewall between the cab and the rearward portion. At least one fastening element is mounted with respect to the sidewall for mounting any one of a plurality of differently-configured sidewall modules at least partially within the elongated opening to provide or alter functionality of the sidewall.

The invention provides increased flexibility in pickup truck functionality and appearance. A pickup truck of the invention functions as a modular base that may be configured in a multitude of ways with different sidewall modules. Thus, a single pickup truck design may form the base of a multitude of truck configurations, enabling a pickup truck manufacturer to realize economies of scale not possible with the prior art and to assemble trucks for niche markets that may not be otherwise profitable. Similarly, pickup truck users may own a single truck, but have the ability to add or alter functionality to their trucks by adding or changing sidewall modules. Accordingly, methods of advantageously employing sidewall modules are provided. One of the methods includes maintaining an inventory of differently-configured sidewall modules configured for attachment to a pickup truck. Another method includes possessing a pickup truck as described above, and attaching a sidewall module to the pickup truck such that the sidewall module is at least partially within the first elongated opening.

The above features and advantages, and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
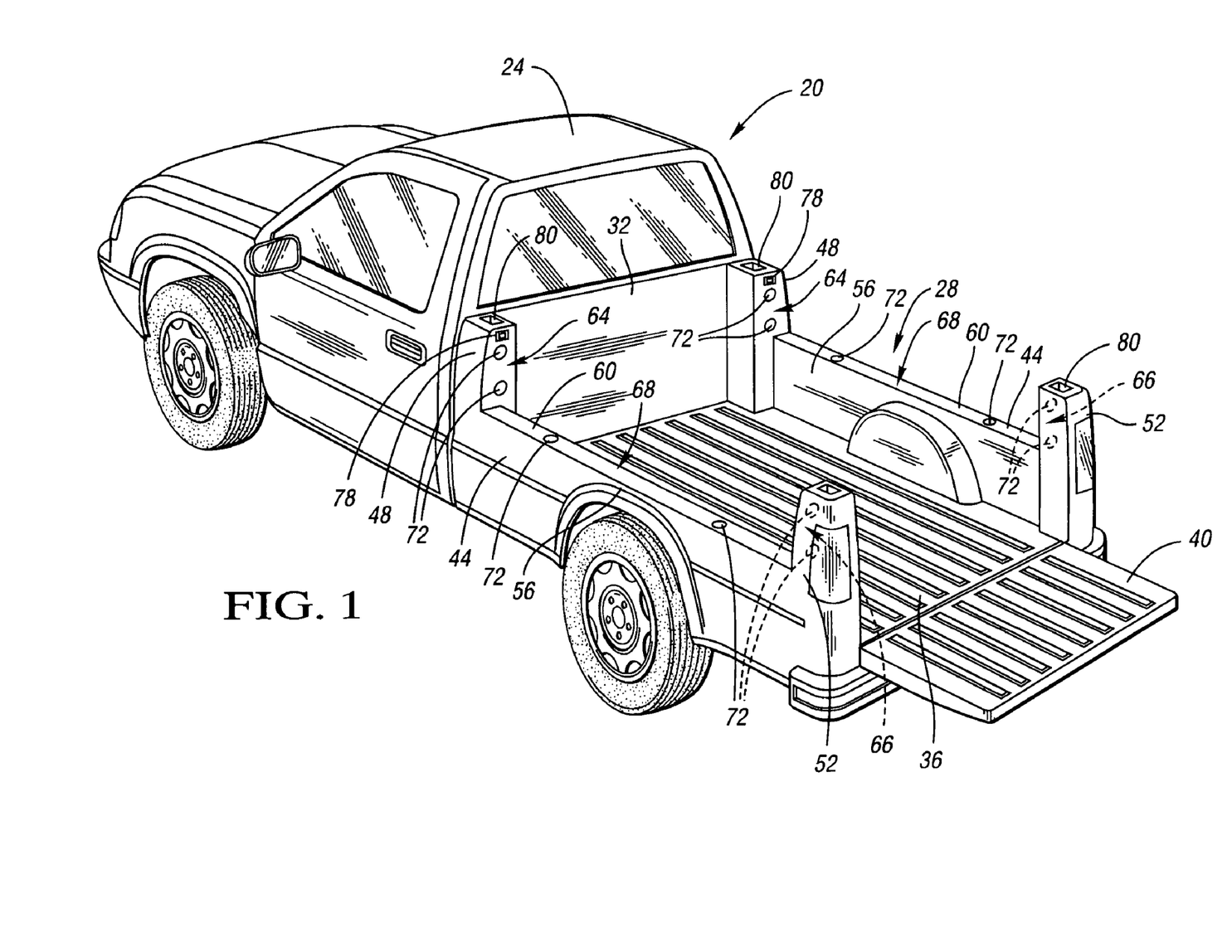
FIG. 1 is a schematic perspective illustration of a pickup truck with sidewalls forming an elongated opening.

Referring to FIG. 1, a pickup truck 20 is schematically depicted. The pickup truck 20 includes a cab 24, and a cargo box 28 rearward of the cab 24. The cargo box 28 is defined by a front wall 32, a box floor 36, a pivotable tailgate 40, and two sidewalls 44. The sidewalls 44 are oriented longitudinally and spaced a distance apart from one another.

Each sidewall 44 has a forward portion 48, a rearward portion 52, and a midportion 56. The midportion 56 has a height that is less than the heights of the forward portion 48 and the rearward portion 52, thus resulting in an elongated opening 60 between the forward portion and the rearward portion. The elongated opening 60 is also between the cab 24 and the rearward portion 52, though not fully coextensive with the space between the cab and rearward portion. The elongated opening 60 is defined by a vertical forward surface 64, a vertical rearward surface 66, and a substantially horizontal lower surface 68. However, and within the scope of the claimed invention, the surface or surfaces defining the elongated opening may be characterized by any of a multitude of shapes, curvatures, and orientations.

Fastening elements 72 on the forward, rearward, and lower surfaces 64, 66, 68 face the elongated opening 60 and are engageable with complementary fastening elements to rigidly retain a sidewall module (not shown) such that at least a portion of the sidewall module is within the elongated opening. The fastening elements 72 form an attachment interface at which any one of a plurality of differently-configured sidewall modules (not shown) is mountable to provide sidewall functionality. The fastening elements 72 depicted are holes formed in the sidewalls 44, and are preferably releasably engageable with complementary fastening elements. Strikers 78 are on the forward surfaces 64 of the sidewalls 44 and are engageable with latches on sidewall modules. Strikers may or may not be present on the pickup truck. For example, a pickup truck may include a fastening element at which a striker is mountable when a particular module requires a striker for functionality. The pickup truck 20 preferably includes stake pockets 80 in the sidewalls 44, and may include tie-downs (not shown) in the cargo box, as is known in the art.

Alternatively, and within the scope of the claimed invention, the forward portion 48 may extend to a height similar to that of the midportion 56. The elongated opening would then extend from the cab 24 at the front wall 32 of the cargo box 28 to the vertical surface 66 on the rearward portion 52 of the sidewall 44. Fastening elements may then be placed on the front wall 32.

Figure 2:
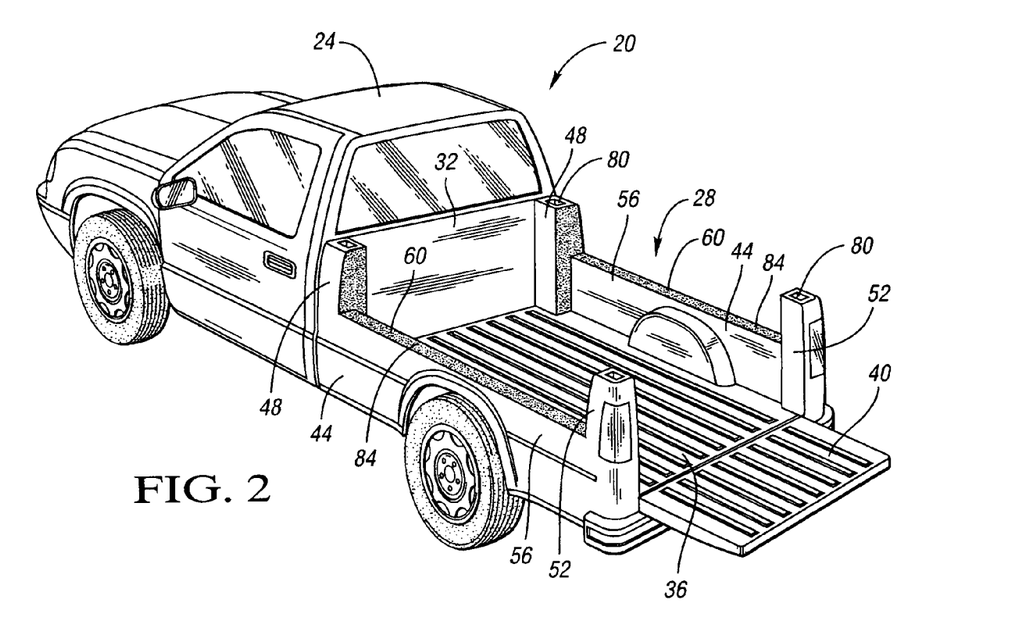
FIG. 2 is a schematic perspective illustration of the pickup truck of FIG. 1 having an anti-scratch trim within the elongated opening.

Referring to FIG. 2, wherein like reference numbers refer to like components from FIG. 1, the pickup truck 20 may be employed without a sidewall module to provide a cargo box 28 with a low sidewall height. The forward, rearward, and lower surfaces 64, 66, 68 may be coated with an anti-scratch trim 84. The elongated opening 60 facilitates access to the cargo box 28 from the side of the pickup truck 20.

Figure 3:
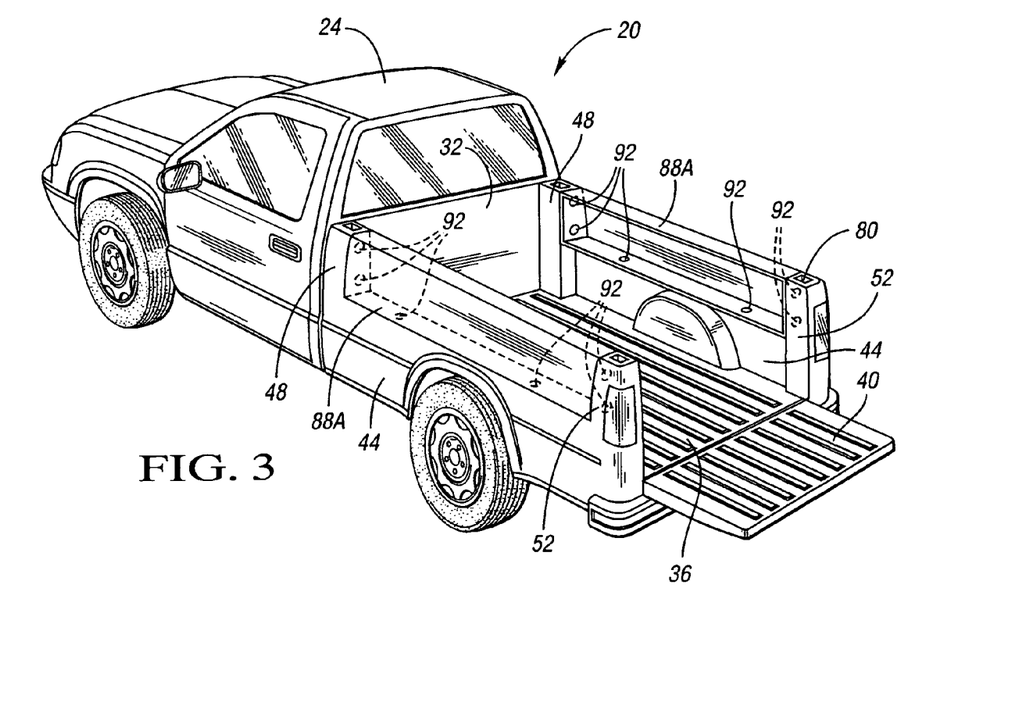
FIG. 3 is a schematic perspective illustration of the pickup truck of FIG. 1 having sidewall modules attached thereto, the sidewall modules substantially filling the opening.

FIGS. 3–12 depict sidewall modules attached to the pickup truck 20 such that the sidewall modules are at least partially within one of the elongated openings. Referring to FIG. 3, wherein like reference numbers refer to like components from FIGS. 1 and 2, an owner or user of the pickup truck 20 may add or alter pickup truck functionality or aesthetics by attaching a sidewall module to the pickup truck such that at least a portion of the sidewall module is within one of the elongated openings. Sidewall modules 88A are mounted to pickup truck 20 at the fastening elements (not shown). Sidewall modules 88A are panels that substantially fill the elongated opening to provide each sidewall 44 with a uniform height. Sidewall modules 88A include complementary fastening elements 92 that align with, and engage, the fastening elements (not shown) on the sidewalls 44. In the embodiment depicted, the complementary fastening elements are holes formed in the sidewall modules 88A. A threaded fastener may then extend through each complementary fastening element 92 and its corresponding fastening element on the sidewalls 44. The holes forming the fastening elements and the complementary fastening elements may be threaded holes to enable one-sided installation of modules, i.e., the modules may be attached to the pickup truck by driving a threaded fastener through the holes without a nut to retain the threaded fastener. Those skilled in the art will recognize other fastening methods and systems that may be employed within the scope of the claimed invention, such as cam locks, latches, etc.

Interchangeability of sidewall modules provides a truck owner or user with flexibility in changing pickup truck functionality. For example, if a pickup truck owner or user desires different functionality from that provided by sidewall modules 88A, the owner or user may remove sidewall modules 88A and attach differently-structured sidewall modules having different functionality, such as the sidewall modules 88B of FIG. 4.

Figure 4:
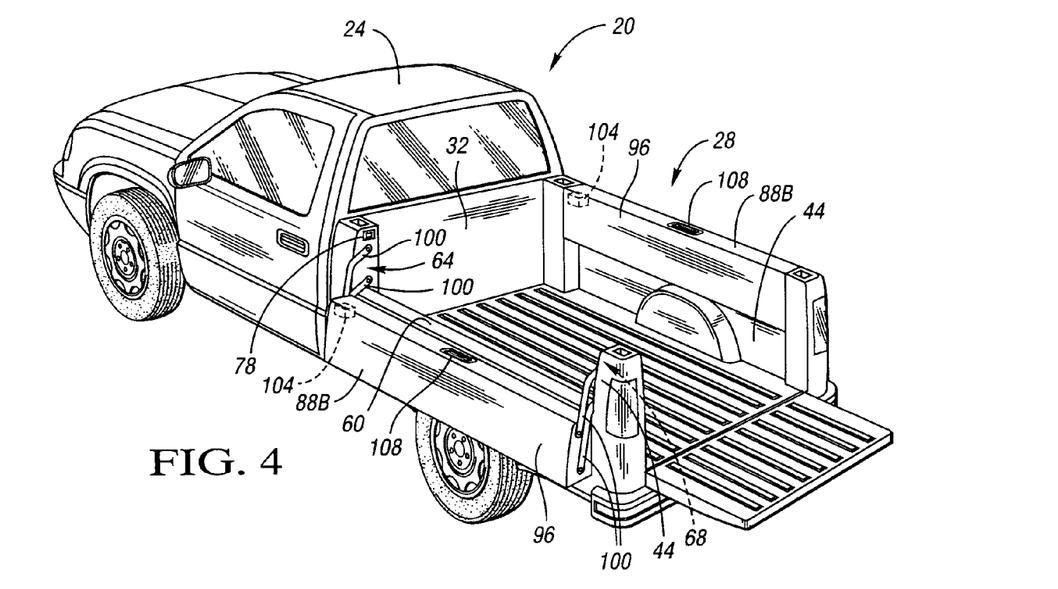
FIG. 4 is a schematic perspective illustration of the pickup truck of FIG. 1 having sidewall modules attached thereto, the sidewall modules having panels movable between an open and closed position.

Referring to FIG. 4, wherein like reference numbers refer to like components from FIGS. 1–3, the pickup truck 20 with sidewall modules 88B mounted thereto is schematically depicted. Sidewall modules 88B each include a panel 96 that is movable between a first position and a second position. In the first position, the panel substantially fills the elongated opening in the sidewall. The sidewall module 88B on the right side of the pickup truck 20 is in the first position. Sidewall modules 88B each include a hinging system 100 mounted at the fastening elements on the forward surfaces 64 and the rearward surfaces 66 of the sidewalls 44 to facilitate movement of the panels to the second position. The panels 96 in the second position are located outboard and downward from the first position such that they are positioned alongside the sidewalls 44 with their smallest dimension oriented generally horizontally to minimize the distance a user must reach to access cargo through the elongated opening. The sidewall module 88B on the left side of the pickup truck 20 is in the second position.

Those skilled in the art will recognize a variety of hinging systems, such as four-bar linkages, that may be employed to guide the panels between the first position and the second position. Four-bar linkages are described in U.S. Pat. No. 6,196,618, issued Mar. 6, 2001 to Pietryga et al, and U.S. Pat. No. 6,213,535, issued Apr. 10, 2001 to Landmesser et al, both of which are hereby incorporated by reference in their entireties. Sidewall modules 88B each include a latch 104 engageable with one of the strikers 78 to retain the sidewall modules 88B in the first position within the elongated openings. Handles 108 are operatively connected to the latches 104 for selectively disengaging the latches 104 from the strikers 78.

Figure 5:
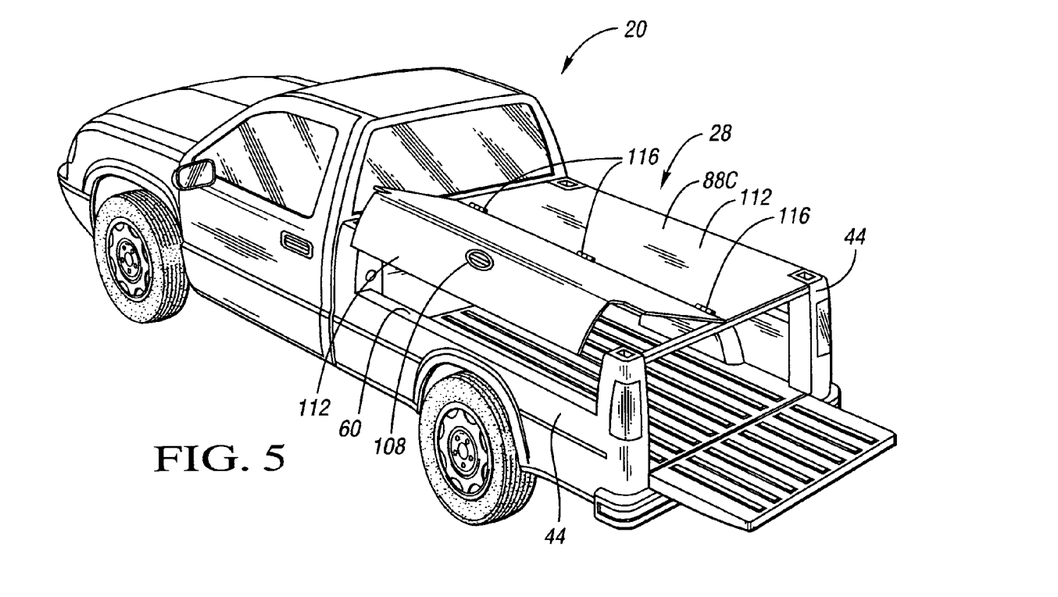
FIG. 5 is a schematic perspective illustration of the pickup truck of FIG. 1 having sidewall modules attached thereto, the sidewall modules forming a tonneau cover.

Referring to FIG. 5, wherein like reference numbers refer to like components from FIGS. 1–4, a sidewall module 88C forms a tonneau cover. The tonneau cover includes two panels 112 that are pivotable about central hinges 116 between a closed position in which the panels 112 are partially within the elongated openings 60 to conceal and protect contents of the cargo box 28, and an open position. Each panel 112 includes a latch (not shown) engageable with the striker on one of the sidewalls 44 to retain the panel 112 in the closed position. A handle 108 is operatively connected to the latch for disengaging the latch from the striker so that a user can open the panel 112 and reach inside the cargo box 28 through the elongated opening 60.

Figure 6:
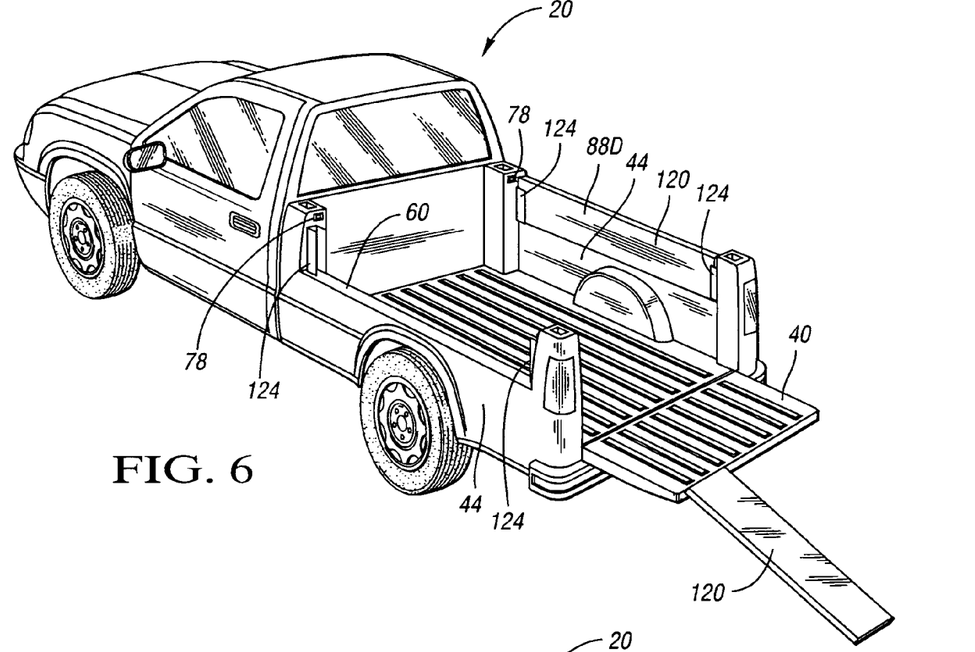
FIG. 6 is a schematic perspective illustration of the pickup truck of FIG. 1 having sidewall modules attached thereto, the sidewall modules including removable ramps.

Referring to FIG. 6, wherein like reference numbers refer to like components from FIGS. 1–5, sidewall modules 88D include removable ramps 120 held in place inside the elongated openings 60 by brackets 124 mounted at the fastening elements (not shown). The ramps 120 may attach to the tailgate 40 for the loading and unloading of vehicles such as lawnmowers and snowmobiles. The ramp 120 for the left side sidewall 44 is shown at the open tailgate 40.

Figure 7:
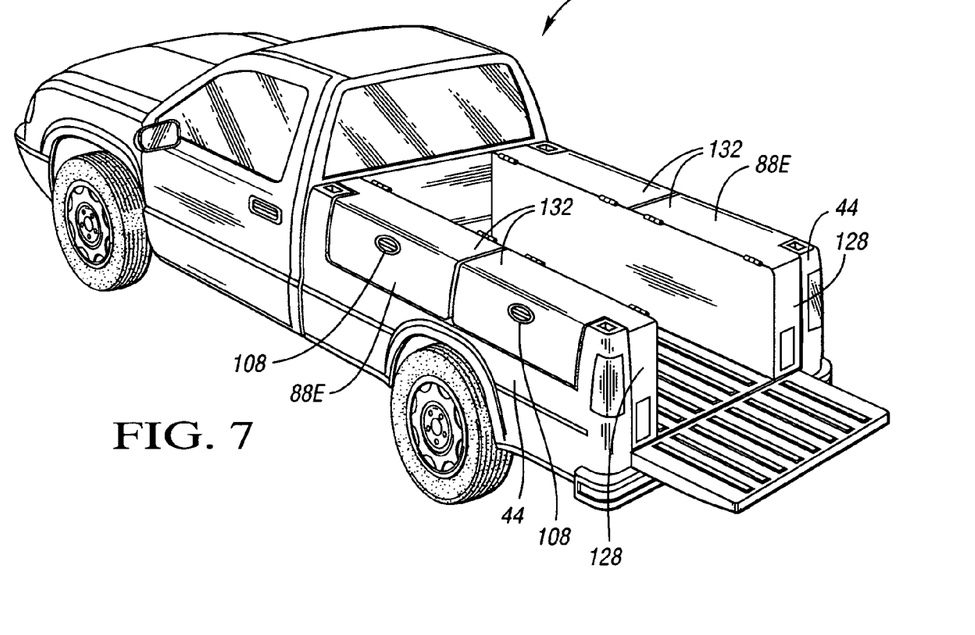
FIG. 7 is a schematic perspective illustration of the pickup truck of FIG. 1 having sidewall modules attached thereto, the sidewall modules including storage boxes with lids at least partially within the elongated openings for providing access to the storage boxes at the elongated openings.
Figure 8:
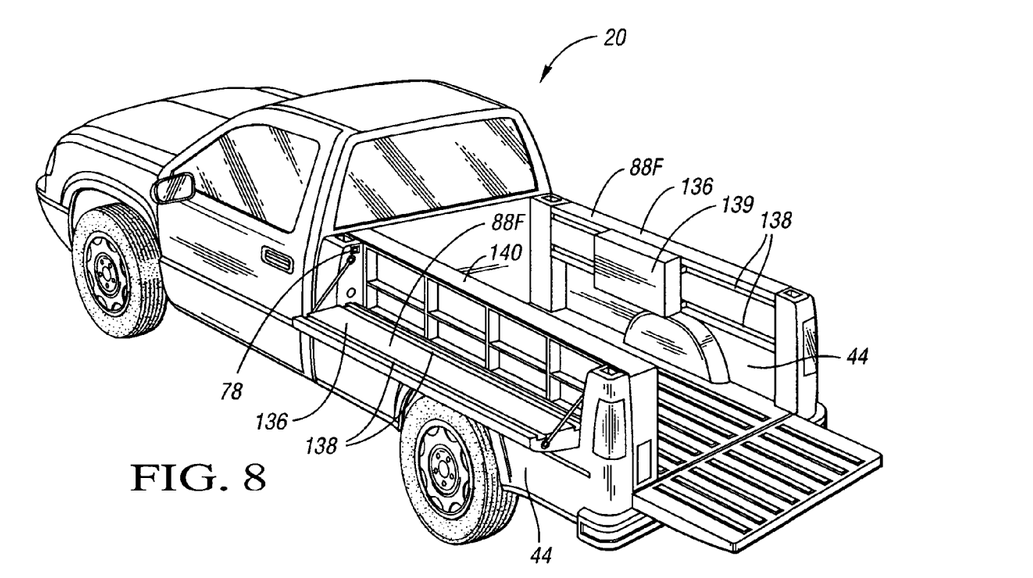
FIG. 8 is a schematic perspective illustration of the pickup truck of FIG. 1 having sidewall modules attached thereto, the sidewall modules including a hinged panel having channels therein at which tools or equipment are mountable.

Referring to FIG. 7, wherein like reference numbers refer to like components from FIGS. 1–6, sidewall modules 88E include storage boxes 128 with hinged lids 132 that extend into the elongated openings for access to the storage boxes 128 from the sides of the truck 20. Referring to FIG. 8, sidewall modules 88F each include a hinged panel 136 pivotable between a closed position in which the panel 136 is substantially entirely within the elongated opening and an open position in which the panel 136 is horizontally oriented. The panel 136 attached at the right sidewall 44 is in the closed position; the panel 136 attached at the left sidewall is in the open position. Two longitudinally-oriented channels 138 on the upwardly-facing surface (when the panel is in the open position) may be employed to mount devices or hardware such as a power tool 139. Those skilled in the art will recognize a variety of devices or hardware that may be mounted at the channels 138, such as a workbench fixture, a power saw, etc. This setup could be used, for example, by a plumber to cut pipe or an electrician to cut conduit at a job site. When in the closed position, the panel 136 may act as a door for a storage box 140.

Figure 9:
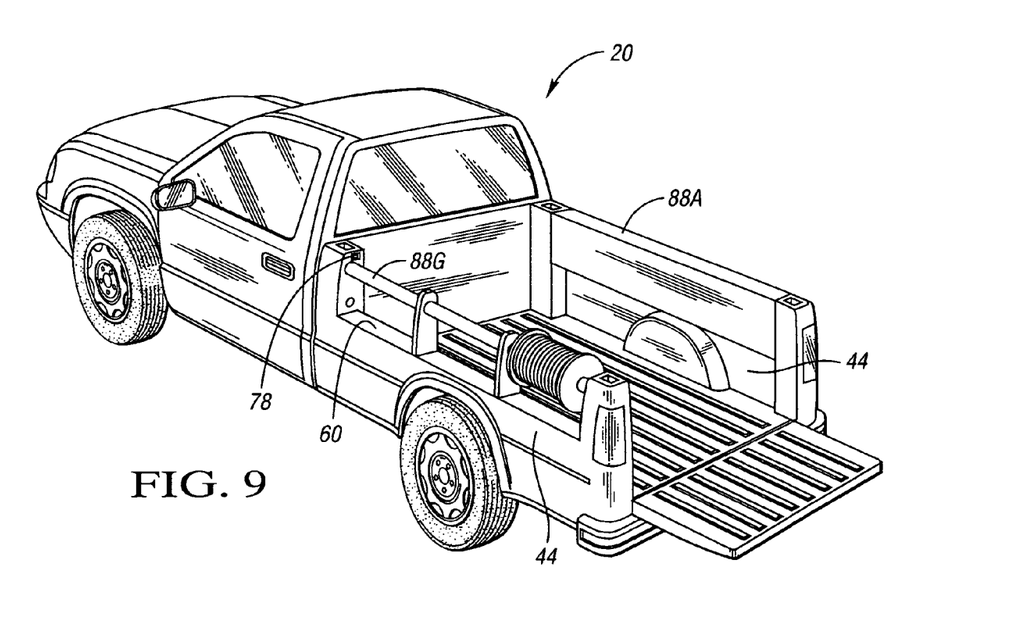
FIG. 9 is a schematic perspective illustration of the pickup truck of FIG. 1 having a sidewall module attached thereto, the sidewall module including a rack configured to carry hoses, cables, etc.

Referring to FIG. 9, sidewall module 88G mounted to the left sidewall 44 of pickup truck 20 is a rack configured to carry hoses, cables, etc. A sidewall module 88A differently-structured and having different functionality from sidewall module 88G is attached to the pickup truck 20 at the right sidewall 44. The modular nature of the pickup truck 20 enables a pickup truck owner or user to use sidewall modules having different structure and function in different sidewalls, thereby further providing flexibility in configuring the pickup truck compared to the prior art.

Figure 10:
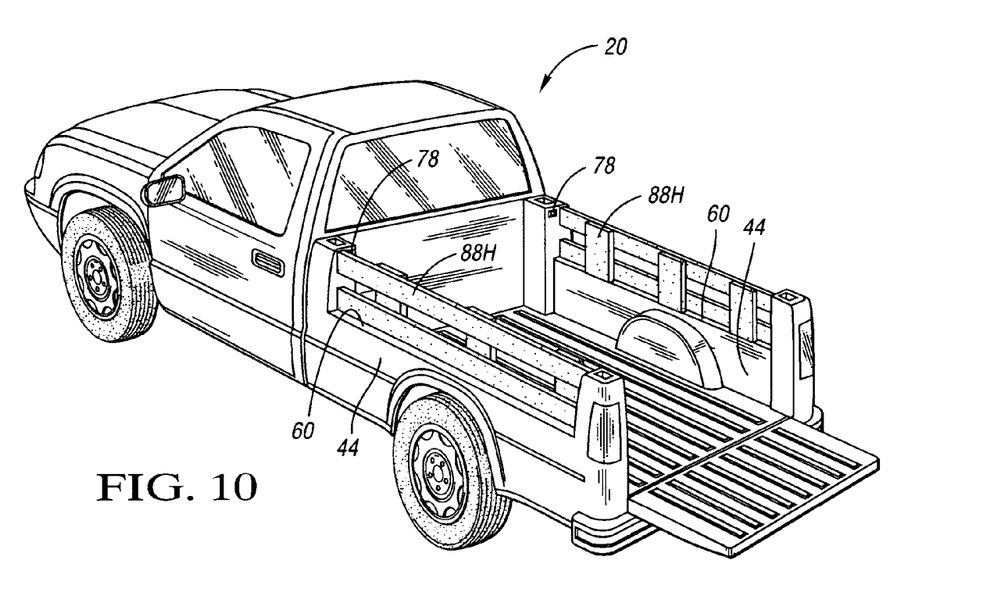
FIG. 10 is a schematic perspective illustration of the pickup truck of FIG. 1 having sidewall modules attached thereto, the sidewall modules configured to provide a stake-box appearance.
Figure 11:
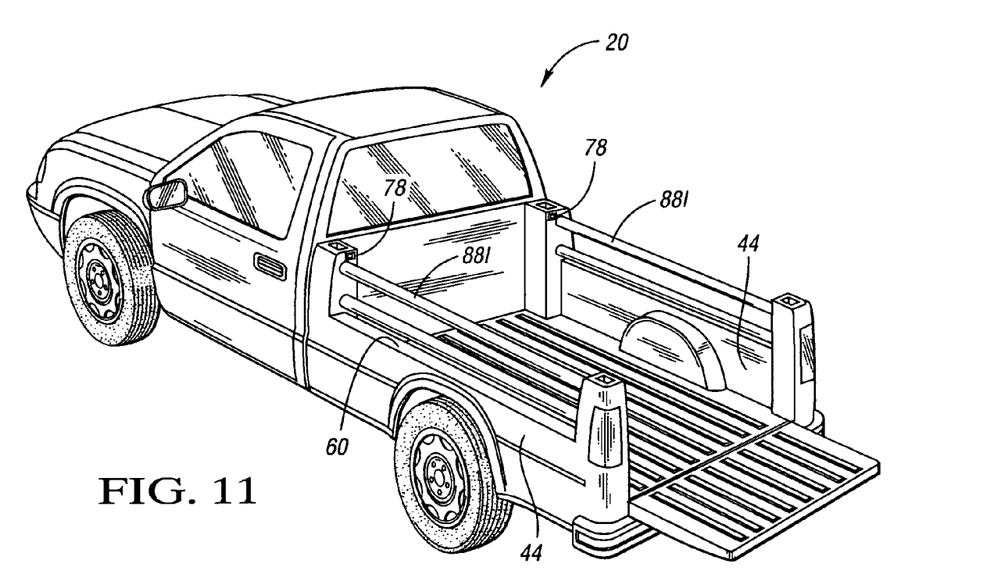
FIG. 11 is a schematic perspective illustration of the pickup truck of FIG. 1 having sidewall modules attached thereto, the sidewall modules being chrome rails.
Figure 12:
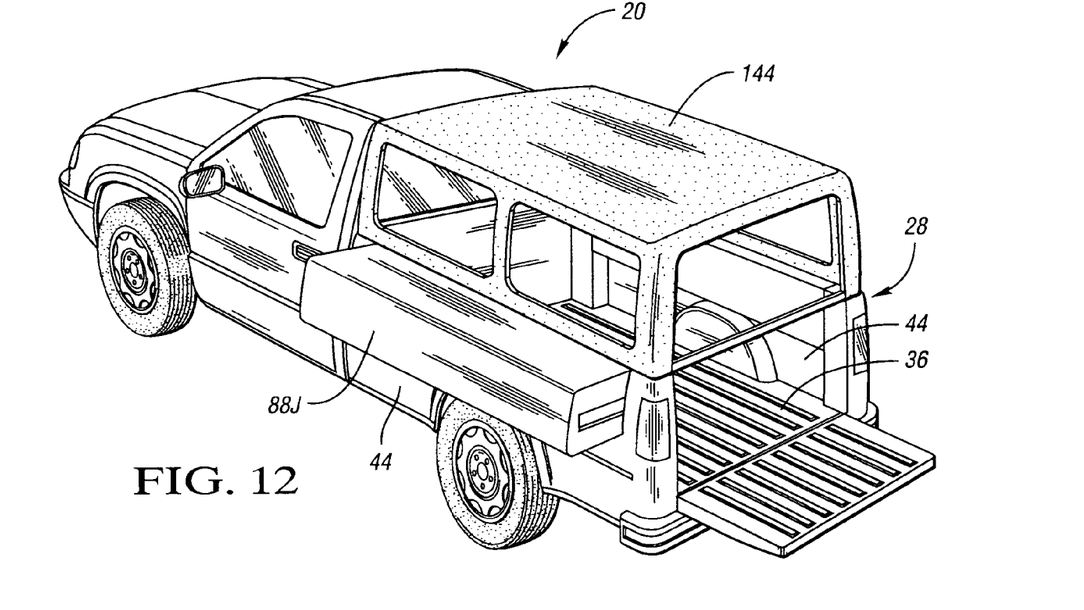
FIG. 12 is a schematic perspective illustration of the pickup truck of FIG. 1 having sidewall module attached thereto, the sidewall module being configured to slide outward from the cargo box to provide increased storage space within the cargo box.

FIG. 10 schematically depicts sidewall modules 88H configured to provide a stake box appearance. FIG. 11 schematically depicts sidewall modules 88I that are chrome rails. FIG. 12 schematically depicts a sidewall module 88J that slides outward from the cargo box 28 and is open on its inboard side to provide increased cargo space inside the cargo box. Sidewall module 88J may be particularly useful in camping scenarios in order to provide storage space as well as sufficient space on the box floor 36 to sleep. A camper top 144 is attached to the cargo box 28 at the stake pockets.

Figure 13:
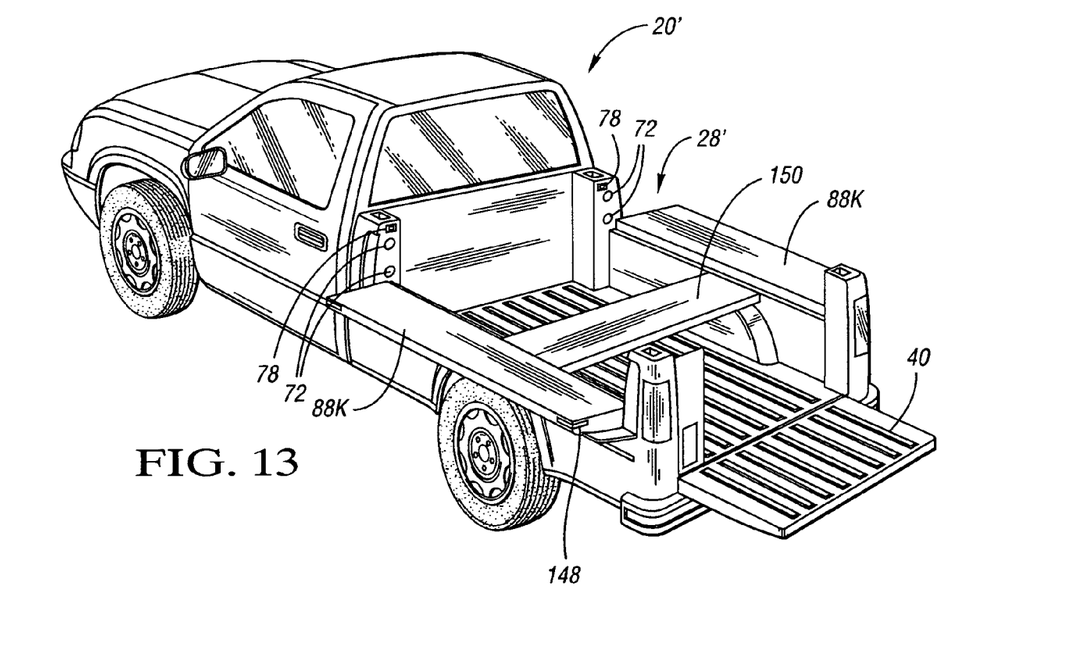
FIG. 13 is a schematic perspective illustration of an alternative pickup truck configuration having a five-foot bed and sidewall modules attached thereto, the sidewall modules pivotable to support a load oriented transversely and extending outboard of the sidewalls.

Referring to FIG. 13, sidewall modules 88K may be advantageously employed in a truck with a box 28' five feet in length. The box 28' is not long enough to carry objects that are eight feet in length, such as plywood and drywall, and loaded longitudinally, without the objects projecting beyond the tailgate 40. Sidewall modules 88K are panels that hinge downward to support eight-foot long objects oriented transversely across the cargo box 28'. The sidewall modules 88K include clearance lights 148. A support 150 may extend across the cargo box 28' to support cargo between the panels. The support 150 of FIG. 13 is depicted resting on wheel wells. However, it may be desirable to provide features for retaining the support 150 within the cargo box 28', such as concavities formed within the sidewalls in which the portions of the support 150 are retained and prevented from moving relative to the truck 20.

Figure 14:
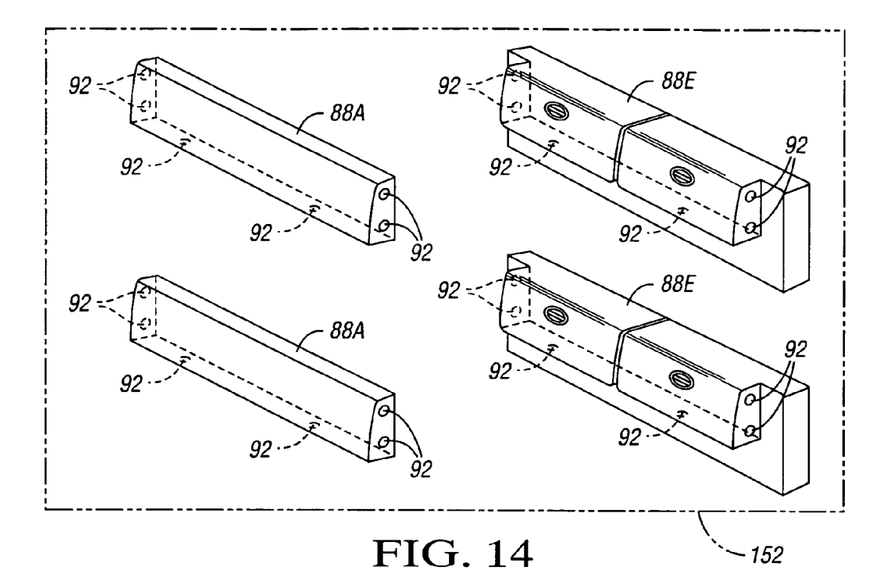
FIG. 14 is a schematic illustration of an inventory of differently-configured sidewall modules being interchangeable within the pickup truck of FIG. 1.

Referring to FIG. 14, an inventory 152 having a plurality of sidewall modules 88A, 88E is schematically depicted. Sidewall module 88A represents a first version of sidewall module that is differently-configured from sidewall module 88E, which represents a second version of sidewall module. Each of the sidewall modules in the inventory includes complementary fastening elements 92 that are sufficiently positioned to align with the fastening elements 72 in the pickup truck 20 of FIG. 1. Accordingly, the sidewall modules 88A, 88E in the inventory are interchangeable with one another in the pickup truck 20 of FIG. 1.

The use of sidewall modules enables a pickup truck manufacturer to assemble differently-configured trucks on a common platform by merely installing differently-configured sidewall modules. Similarly, a pickup truck owner or user can interchange modules to change the functionality or appearance of sidewalls and, correspondingly, the pickup truck. Accordingly, a method for advantageously employing sidewall modules is provided.

Figure 15:
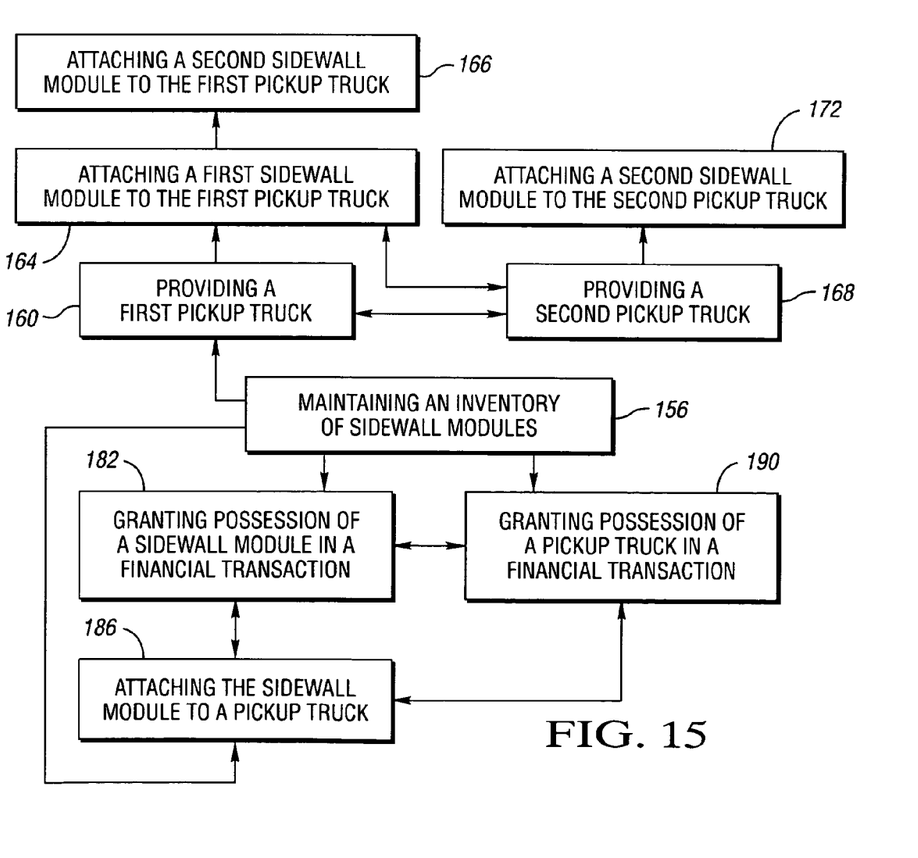
FIG. 15 is a flow chart depicting methods of advantageously employing sidewall modules.

Referring to FIG. 15, the method includes maintaining an inventory having a plurality of sidewall modules 156. Each of the plurality of sidewall modules in the inventory is mountable in a pickup truck having a cab and a sidewall. The sidewall is characterized by a forward portion and a rearward portion. An elongated opening is formed in the sidewall between the cab and the rearward portion to receive at least a portion of any one of the plurality of sidewall modules. At least one fastening element is mounted with respect to the sidewall. Each of the plurality of sidewall modules has at least one complementary fastening element thereon engageable with the at least one fastening element. The plurality of sidewall modules includes a first version and a second version of sidewall module; the first version is differently configured from the second version.

A manufacturer of pickup trucks maintaining the inventory may employ modules from the inventory to build pickup trucks of differing functional or aesthetic characteristics on a common base. Accordingly, the method may also include providing a first pickup truck 160. The first pickup truck has a first cab and a first sidewall having a forward portion and a rearward portion. A first elongated opening is formed in the first sidewall between the first cab and the rearward portion to receive at least a portion of any one of the plurality of sidewall modules. At least one fastening element is mounted with respect to the first sidewall at which any one of the plurality of differently-configured sidewall modules in the inventory is mountable to provide or alter functionality of the sidewall. The method may also include attaching a first sidewall module selected from the inventory to the first pickup truck such that at least a portion of the first sidewall module is within the first elongated opening 164.

The first pickup truck may also include a second sidewall having a forward portion and a rearward portion. A second elongated opening may be formed in the second sidewall between the cab and the rearward portion, and at least one fastening element may be mounted with respect to the second sidewall for mounting any one of a plurality of differently-configured sidewall modules at least partially within the second elongated opening. Accordingly, the method may further comprise attaching a second sidewall module to the first pickup truck such that at least a portion of the second sidewall module is within the second elongated opening 166. The second sidewall module is differently-structured and has a different functionality from the first sidewall module.

The method may also include providing a second pickup truck 168. The second pickup truck has a second cab and a second sidewall having a forward portion and a rearward portion. A second elongated opening is formed in the second sidewall between the cab and the rearward portion of the second sidewall to receive at least a portion of any of the plurality of sidewall modules. At least one fastening element is mounted with respect to the second sidewall at which any one of the plurality of differently-configured sidewall modules in the inventory is mountable to provide or alter functionality of the sidewall. The method may also include attaching a second sidewall module selected from the inventory to the second pickup truck such that at least a portion of the second sidewall module is within the second elongated opening 172. The second sidewall module is a different version from the first sidewall module. The method may also include assembling the first pickup truck and assembling the second pickup truck (not shown).

A retailer may also maintain the inventory and make sidewall modules from the inventory available to customers who wish to modify the functionality of a pickup truck. Accordingly, the method may also include granting possession of a sidewall module taken from the inventory in a financial transaction 182. The retailer may also install the module in a customer's truck. Accordingly, the method may also include attaching the sidewall module taken from the inventory in a pickup truck 186. Maintaining the sidewall module inventory may enable a retailer of pickup trucks to provide consumers sidewall panel options when purchasing or leasing a pickup truck. Accordingly, the method may also include granting possession of the pickup truck in a financial transaction 190.

While the best modes for carrying out the invention have been described in detail, those familiar with the art to which this invention relates will recognize various alternative designs and embodiments for practicing the invention within the scope of the appended claims.

The invention claimed is:

1. A pickup truck comprising:
   a cab;
   a sidewall at least partially defining a pickup truck cargo box, the sidewall having a forward portion and a rearward portion, said forward portion being characterized by a first height and said rearward portion being characterized by a second height; wherein no part of the sidewall rearward of the forward portion and forward of the rearward portion extends higher than a third height that is less than the first and second heights to form an elongated opening in the sidewall between the cab and the rearward portion; and
   at least one fastening element mounted with respect to the sidewall for mounting any one of a plurality of differently-configured sidewall modules at least partially within the elongated opening to provide or alter functionality of the sidewall.

2. The pickup truck of claim 1, wherein said at least one fastening element faces the elongated opening.

3. The pickup truck of claim 1, wherein said at least one fastening element is configured for releasable engagement with a complementary fastening element on said any one of a plurality of differently-configured sidewall modules to enable module interchangeability.

4. The pickup truck of claim 1, wherein the elongated opening extends from the forward portion to the rearward portion of the sidewall.

5. A method of adding or altering pickup truck sidewall functionality, the method comprising:
   possessing a pickup truck, the pickup truck including a cab and a first sidewall, the first sidewall having a first forward portion and a first rearward portion, said first forward portion being characterized by a first height and said first rearward portion being characterized by a second height; wherein no part of the first sidewall rearward of the first forward portion and forward of the first rearward portion extends higher than a third height that is less than the first and second heights to form a first elongated opening in the first sidewall between the cab and the first rearward portion; and
   attaching a first sidewall module to the pickup truck such tat the first sidewall module is at least partially within the first elongated opening.

6. The method of claim 5, wherein the pickup truck has a second sidewall having a second forward portion and a second rearward portion, said second forward portion being characterized by a fourth height and said second rearward portion being characterized by a fifth height; wherein no part of the second sidewall rearward of the second forward portion and forward of the second rearward portion extends higher than a sixth height that is less than the fourth and fifth heights to form a second elongated opening in the second sidewall between the cab and the second rearward portion; and
   wherein the method further comprises attaching a second sidewall module to the pickup truck such that the second sidewall module is at least partially within the second elongated opening; and
   wherein the second sidewall module is differently-structured and has a different functionality from the first sidewall module.

7. The method of claim 5, further comprising removing a second sidewall module from the first elongated opening prior to said attaching the first sidewall module, the second sidewall module being differently-structured and having a different functionality from the first sidewall module.

8. A pickup truck comprising:
   a sidewall at least partially defining a pickup truck cargo box and having a forward portion and a rearward portion, said forward portion being characterized by a first height and said rearward portion being characterized by a second height; wherein no part of the sidewall rearward of the forward portion and forward of the rearward portion extends higher than a third height that is less than the first and second heights to form an elongated opening in the sidewall between the forward and rearward portions, the opening being uncovered and upwardly open; and
   at least one fastening element facing the elongated opening and at which any one of a plurality of differently-configured sidewall modifies is releasably mountable to provide or alter functionality of the sidewall.

* * * * *